(12) United States Patent     (10) Patent No.:     US 12,675,355 B2

Sivakumar et al.                  (45) Date of Patent:     Jul. 7, 2026

(54) MONITORING EFFECTS OF FORCIBLE ACTIONS OVER A NORMALIZED FEATURE SET

(71) Applicant: International Business Machines Corporation, Armonk, NY (US)

(72) Inventors: Gandhi Sivakumar, Bentleigh (AU); Nikhil Sai Krishna Jonnavithula, Visakhapatnam (IN); Anil Raj Thota, Visakhapatnam (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 923 days.

(21) Appl. No.: 18/050,685

(22) Filed: Oct. 28, 2022

(65) Prior Publication Data

US 2024/0143427 A1     May 2, 2024

(51) Int. Cl.
  *G06F 11/07*     (2006.01)
  *G06F 18/23*     (2023.01)
(52) U.S. Cl.
  CPC ........ *G06F 11/076* (2013.01); *G06F 11/0709* (2013.01); *G06F 18/23* (2023.01)
(58) Field of Classification Search
  CPC ..... G06F 11/0709; G06F 11/076; G06F 18/23
  See application file for complete search history.

(56) References Cited

U.S. PATENT DOCUMENTS

| | | | |
|---|---|---|---|
| 11,743,280 B1 * | 8/2023 | Dreval | H04L 63/1425 |
| | | | 726/4 |
| 2018/0173894 A1 * | 6/2018 | Boehler | G06F 16/285 |
| 2019/0188212 A1 | 6/2019 | Miller et al. | |
| 2019/0294990 A1 | 9/2019 | Lopez De Prado | |
| 2019/0355479 A1 | 11/2019 | Carlson et al. | |

(Continued)

OTHER PUBLICATIONS

Siddiqui et al., "Detecting Cyber Attacks Using Anomaly Detection with Explanations and Expert Feedback", Apr. 17, 2019, ICASSP 2019—2019 IEEE International Conference on Acoustics, Speech and Signal Processing (ICASSP), pp. 2872-2876. (Year: 2019).*

(Continued)

*Primary Examiner* — Brent Johnston Hoover
(74) *Attorney, Agent, or Firm* — Amin, Turocy & Watson, LLP

(57)     ABSTRACT

One or more systems, devices, computer program products and/or computer implemented methods of use provided herein relate to a process of monitoring the effect of forcible actions over a normalized feature set. A system can comprise a memory that stores computer executable components, and a processor that executed the computer executable components stored in the memory, wherein the computer executable components can comprise an input component that can receive one or more forcible actions as input from a user that correspond to an identified anomaly instance of a cluster, an evaluation component that can evaluate an effect of the one or more forcible actions executed over time on the system, and a notification component that can notify the user that a true-positive detection threshold has been reached for a cluster such that true-positives are not detected in the cluster.

20 Claims, 8 Drawing Sheets

(56)                    References Cited

U.S. PATENT DOCUMENTS

2020/0021607 A1      1/2020   Muddu et al.

OTHER PUBLICATIONS

Garg, et al., "An Evaluation of Anomaly Detection and Diagnosis in Multivariate Time Series," Accepted at IEEE TNNLS Special Issue on Deep Learning for Anomaly Detection Aug. 2021, Date of Publication: Aug. 31, 2021, DOI: 10.1109/TNNLS.2021.3105827.

Balcan, et al., "Clustering with Interactive Feedback," ALT '08: Proceedings of the 19th international conference on Algorithmic Learning Theory, Oct. 2008, https://doi.org/10.1007/978-3-540-87987-9_27.

Basu, et al., "Semi-supervised Clustering: Learning with Limited User Feedback," PhD Proposal, Nov. 2003 (Also Appears as Technical Report, UT-AI-TR-03-307).

Bohutska, "Anomaly Detection—How to Tell Good Performance from Bad," https://towardsdatascience.com/anomaly-detection-how-to-tell-good-performance-from-bad-b57116d71a10, Aug. 17, 2021.

Github, "Hierarchical Cluster Analysis," UC Business Analytics R Programming Guide, https://uc-r.github.io/ hc_clustering#optimal, Aug. 4, 2022.

Huang, et al., "Text Clustering with Extended User Feedback," SIGIR '06: Proceedings of the 29th annual International Acm Sigir conference on Research and development in information retrieval, Aug. 2006, pp. 413-420, https://doi.org/10.1145/1148170.1148242.

Cohn, et al., "Semi-supervised Clustering with User Feedback," Oct. 2001.

Cornell, "Semi-Supervised Learning, Clustering with User Feedback, and Meta Clustering," Retrieved from the Internet: Aug. 30, 2022.

Author Unknown, "14 Clustering Techniques," Retrieved from the Internet: Aug. 30, 2022.

No Author, "Hierarchical Algorithms for Clustering", https://web.archive.org/web/20210412215619/https://cse.iitkgp.ac.in/~dsamanta/courses/da/resources/slides/14ClusteringTechniques.pdf, Apr. 12, 2021, 23 pages.

* cited by examiner

100

102

INPUT
COMPONENT

104

EVALUATION
COMPONENT

106

NOTIFICATION
COMPONENT

120

SYSTEM BUS

122

PROCESSOR

124

MEMORY/
STORAGE

130

NETWORK(S)

134

COMPUTER
APPLICATION(S)

132

INPUT DEVICE(S)

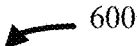

COMPUTER   601

PROCESSOR SET   610

PROCESSING CIRCUITRY   620          CACHE   621

COMMUNICATION FABRIC   611

VOLATILE MEMORY   612

PERSISTENT STORAGE   613

OPERATING SYSTEM 622

700

PERIPHERAL DEVICE SET   614

UI DEVICE SET   623          STORAGE   624          IoT SENSOR SET   625

NETWORK MODULE   615

WAN   602

END USER DEVICE   603

REMOTE SERVER   604

REMOTE DATABASE   630

PRIVATE CLOUD   606

GATEWAY   640

PUBLIC CLOUD   605

CLOUD ORCHESTRATION MODULE   641          HOST PHYSICAL MACHINE SET   642

VIRTUAL MACHINE SET   643          CONTAINER SET   644

FIG. 6

MONITORING EFFECTS OF FORCIBLE ACTIONS OVER A NORMALIZED FEATURE SET

BACKGROUND

One or more embodiments described herein relate generally to monitoring the effects of forcible actions over a normalized feature set of data, and more specifically, to a system that monitors and notifies a user that a true-positive detection threshold has been reached for a cluster. Embodiments relate to receiving the forcible action, evaluating the effect of the forcible action over time on the system, and notifying the user.

SUMMARY

The following presents a summary to provide a basic understanding of one or more embodiments described herein. This summary is not intended to identify key or critical elements, or delineate any scope of the particular embodiments or any scope of the claims. The sole purpose of the summary is to present concepts in a simplified form as a prelude to the more detailed description that is presented later. In one or more embodiments described herein, systems, devices, computer-implemented methods, and/or computer program products that facilitate error monitoring for quantum computing are described.

According to an embodiment, a system can comprise a memory that stores computer executable components, and a processor operably coupled to the memory that executes the computer executable components stored in the memory. The system can include an input component that receives one or more forcible actions as input from a user that correspond to an identified anomaly instance of a cluster. The system can also include an evaluation component that evaluates an effect of the one or more forcible actions executed over time on the system, and a notification component that notifies the user that a true-positive detection threshold has been reached for a cluster such that true-positives are not detected in the cluster.

According to another embodiment, a computer-implemented method of monitoring the effect of forcible actions over a normalized feature set can include receiving, using a processor, one or more forcible actions as input from a user that correspond to an identified anomaly instance of a cluster. Further, the method can include evaluating, using the processor, an effect of the one or more forcible actions executed over time on the system. The computer-implemented method can include notifying, using the processor, the user that a true-positive detection threshold has been reached for a cluster such that true-positives are not detected in the cluster.

According to yet another embodiment, a computer program product for monitoring the effect of forcible actions over a normalized feature set, the computer program product can comprise a computer readable storage medium having program instructions embodied therewith, the program instructions executable by a processor can cause the processor to receive one or more forcible actions as input from a user that correspond to an identified anomaly instance of a cluster. Additionally, the program instructions can cause the processor to evaluate an effect of the one or more forcible actions executed over time on the system. The program instructions can further cause the processor to notify the user that a true-positive detection threshold has been reached for a cluster such that true-positives are not detected in the cluster.

DESCRIPTION OF THE DRAWINGS

FIG. 6 illustrates a block diagram of an example, non-limiting operating environment in which one or more embodiments described herein can be facilitated.

DETAILED DESCRIPTION

Figure 1:
FIG. 1 illustrates a block diagram of an example, non-limiting system that can facilitate monitoring the effect of forcible actions over a normalized feature set, in accordance with one or more embodiments described herein.

The following detailed description is merely illustrative and is not intended to limit embodiments or application or uses of embodiments. Furthermore, there is no intention to be bound by any expressed or implied information presented in the preceding Background or Summary sections, or in this Detailed Description section.

In embodiments, clustering algorithms can be utilized to find groups of similar objects in datasets. Additionally, clustering algorithms can be utilized to detect patters in groups of objects and/or data. Data can be sorted in a variety of manners via clustering algorithms to facilitate data exploration and analysis. Clustering algorithms can include semi-supervised learning, spectral clustering, meta clustering, and hierarchical clustering. Clustering algorithms utilizing hierarchical clustering begin with one or all data points and converge or diverge to form new clusters. Further, clustering algorithms utilizing spectral clustering can be used where data is dense and the number of clusters need not be defined by the user (e.g., DBScan Algorithm). Additionally, meta clustering algorithms implement a cluster of various clustering whereby the user can select the best clustering technique. For example and without limitation, hierarchical clustering algorithms can be used which can include agglomerative clustering (e.g., AGNES) and divisive hierarchical clustering (e.g., DIANA). Further, agglomerative clustering can group and sort data in a bottom-up manner, while divisive hierarchical clustering can group and sort data in a top-down manner.

In examples, clustering can be utilized for specific business use cases such as anomaly detection in the financial sector or network field. In such use cases, anomalies are important to present to a user for interpretation and decision making. For example, a dataset can include information relating to customers associated with a service/product provider. Further, the dataset can be grouped and clustered for additional analysis (e.g., clustered based on customer age with respect to a particular service/product). For a particular service/product, a user may desire to analyze the age groups associated with the particular service/product. When applying the clustering algorithm, the algorithm can identify one or more anomalies with respect to the data. In examples, a user can be expected to input an action associated with the anomaly to assist in accurate clustering in accordance with the user's clustering objective.

Nonetheless, even though clustering results can be provided, a problem associated with clustering algorithm approaches, is that they are not supported with an ability to monitor actions provided by the user with respect to the identified anomalies. Further, they are not supported with the ability to monitor clusters over time and analyze/predict user provided forcible actions on those clusters. Additionally, previous clustering algorithms and systems do not consider the effect over time of the forcible actions on anomalies and the overall ability of the algorithm to detect an anomaly within a cluster. In other words, the clustering algorithm can reach a saturation point after iterative user input forcible actions where anomalies are no longer detected and grouped by the clustering algorithm.

Given these problems, one or more embodiments described herein can be implemented to produce a solution to one or more of these problems in the form of systems, computer-implemented methods, and/or computer program products that can facilitate the following processes: receiving one or more forcible actions as input from a user that correspond to an identified anomaly instance of a cluster, evaluating an effect of the one or more forcible actions executed over time on the system; and notifying the user that a true-positive detection threshold has been reached for a cluster such that true-positives are not detected in the cluster. That is, embodiments described herein include one or more systems, computer implemented methods, apparatuses and/ or computer program products that can facilitate one or more of the aforementioned processes.

FIG. 1 illustrates a block diagram of an example, non-limiting monitoring system 100 that comprises an input component 102, an evaluation component 104, and a notification component 106. The input component 102, the evaluation component 104, and the notification component 106 can be operatively connected such as to process/analyze a dataset connected with the monitoring system 100. The non-limiting monitoring system 100 can receive one or more forcible actions as input from a user. For example and without limitation, the forcible action input by the user can include the pulling or pushing of the identified anomaly into a specified group. The user can selectively push and pull anomalies identified by the monitoring system 100 to generate a more accurate clustering of the dataset. When the system identifies an anomaly via the processor, the monitoring system 100 can await user input to perform an action on the anomaly (e.g., push/pull to a specified group). These artificially induced groups provide a more accurate interpretation of the dataset by considering user input. Repetitive description of like elements employed in other embodiments described herein is omitted for sake of brevity. Aspects of systems (e.g., the monitoring system 100 and the like), apparatuses or processes in various embodiments of the present invention can constitute one or more machine-executable components embodied within one or more machines (e.g., embodied in one or more computer readable mediums (or media) associated with one or more machines). Such components, when executed by the one or more machines (e.g., computers, computing devices, virtual machines, a combination thereof, and/or the like) can cause the machines to perform the operations described.

Additional description of functionalities will be further described below with reference to the example embodiments of FIGS. 1 and 2, where repetitive description of like elements and/or processes employed in respective embodiments is omitted for sake of brevity. The monitoring system 100 can receive input from a user via the input component 102, evaluate the effect of the input received over time on the monitoring system 100 via the evaluation component 104, and notify the user that a detection threshold has been reached via the notification component 106. As such, the input component 102, the evaluation component 104 and the notification component 106 can be operatively linked together.

With embodiments, the input component 102, the evaluation component 104, and the notification component 106 can be operatively linked together such as to process data for anomaly detection and monitoring. In examples, the query interpretation system can be connected with a system bus 120, a processor 122, a memory/storage component 124, one or more networks 130, one or more input devices 132, and one or more computer application 134, which can be associated with cloud computing environment 600 (FIG. 6). In embodiments, the monitoring system 100 can be connected to process a dataset via the input component 102, network(s) 130, input devices 132, and computer application(s) 134.

Figure 3A:
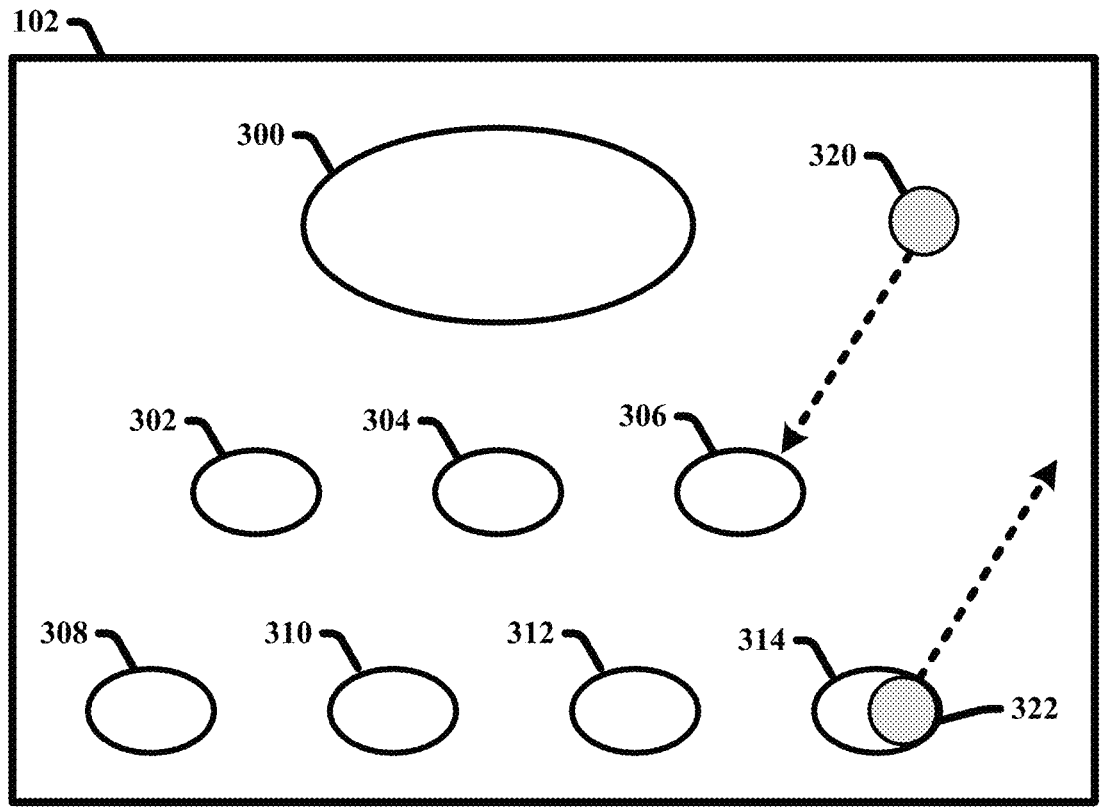
FIG. 3A illustrates a diagram of forcible actions performed on a cluster via hierarchical clustering algorithm DIANA, in accordance with one or more embodiments described herein.
Figure 3B:
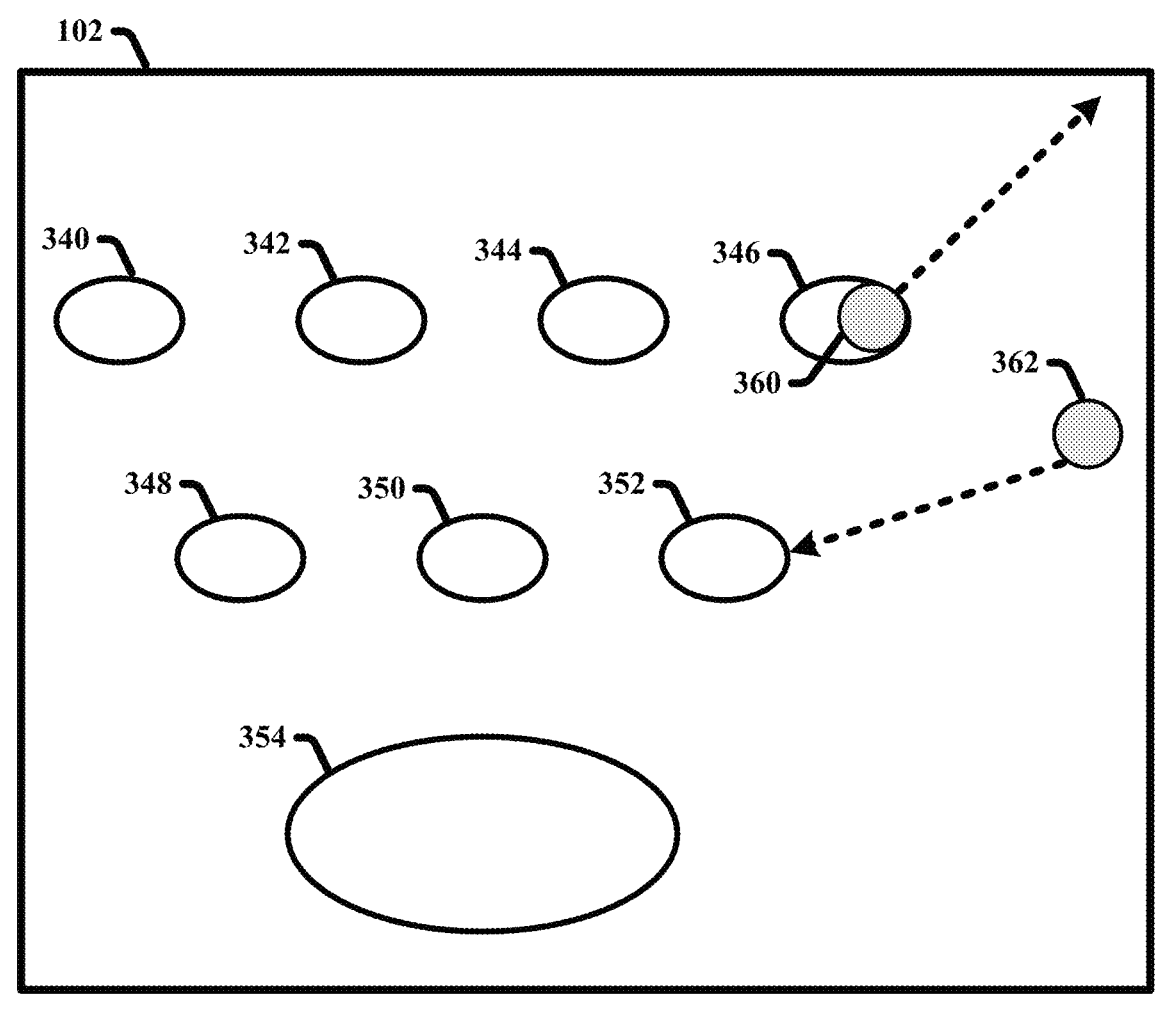
FIG. 3B illustrates a diagram of forcible actions performed on a cluster via hierarchical clustering algorithm AGNES, in accordance with one or more embodiments described herein.

In embodiments, FIG. 1 illustrates a block diagram of an example, non-limiting monitoring system 100 that can address the challenges of monitoring the effect of forcible actions over a normalized feature set in accordance with one or more embodiments described herein. The input component 102 can receive one or more forcible actions as input from a user that correspond to an identified anomaly instance of a cluster. For example and without limitation, the forcible actions can include pulling or pushing an object to or from a cluster at one or more of a variety of specified distances. Further, the evaluation component 104 can be connected with the input component 102 such that the evaluation component 104 can process the user input with respect to the overall performance of the system 100. For example, the evaluation component can monitor/determine/ evaluate the result of pulling or pushing an anomaly (e.g., such as generally illustrated by FIGS. 3A and 3B). Evaluating the effect of forcible actions can include determining one or more of a variety of metrics. In embodiments, the evaluation component 104 can determine whether the cluster to anomaly match is within a pre-determined confidence threshold via the evaluation component 104. The pre-determined confidence threshold can be set by the user and can be received via the input component 102. The user can additionally utilize the input component 102 to set the confidence threshold, input forcible actions, choose a different clustering algorithm, and reset the learning of the system 100.

Figure 2:
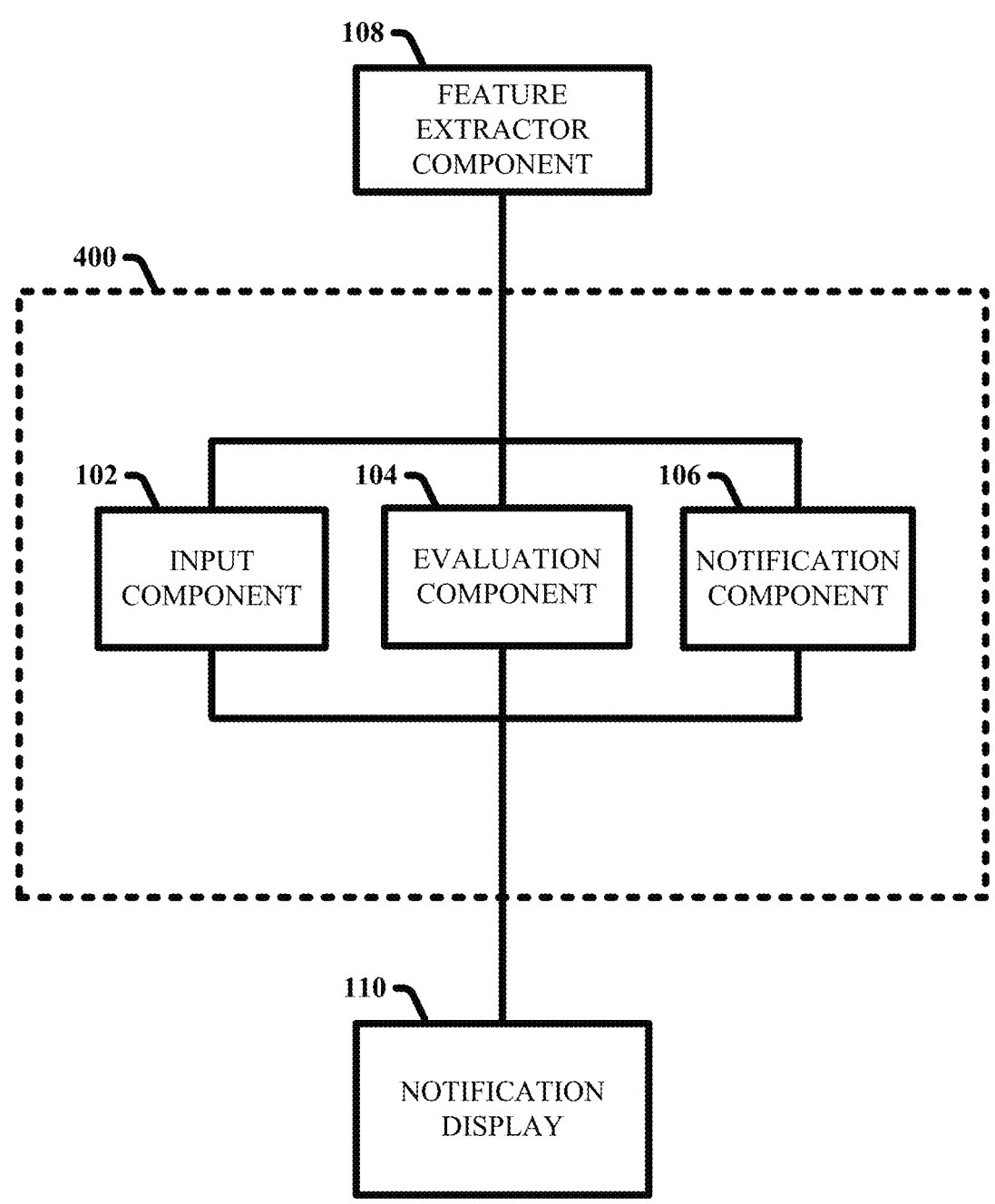
FIG. 2 illustrates a block diagram of an example, non-limiting system that can facilitate monitoring the effect of forcible actions over a normalized feature set, in accordance with one or more embodiments described herein.

Turning now to embodiments illustrated by FIG. 2, the monitoring system 100 can further include a feature extractor component 108 and notification display 110 operatively connected with the input component 102, the evaluation component 104, and the notification component 106. The feature extractor component 108 can receive a dataset as input and can extract a normalized feature set from the provided dataset. For example, the feature extractor component 108 can process the raw data of the dataset into numerical features that can be processed while preserving the information of the original dataset. The evaluation component 104, the feature extractor component 108, and the processor 122 can iteratively apply one or more clustering algorithms to detect anomalies of the dataset for action by the user.

With embodiments, the monitoring system 100 can include a notification display 110 that can communicate to the user an identifies anomaly for action. The notification display 110 can be operatively connected with the notification component 106 such that the notification display 110 communicates analyses of the system 100 to the user for interpretation/action. The input component 102 can expect the user to respond with a desired forcible action (e.g., a push or pull of an anomaly into or from a cluster). The evaluation component 104 can determine whether the metric value of an element (e.g., an anomaly) is greater than a pre-determined threshold, and the input component 102 can receive user input in response to the identified anomaly. While the monitoring system 100 is iteratively applying one or more clustering algorithms, the evaluation component 104 can monitor the effect of user input (e.g., forcible actions) on the performance of the iteratively applied clustering algorithms. In other words, the evaluation component 104 can determine whether true-positives will be detected by the clustering algorithm based on the user input and history of pushed/pulled anomalies. The evaluation component 104 can receive a command from the user to push or pull the respective anomaly from one or more levels of clusters in a group.

Turning now to FIGS. 3A and 3B, the monitoring system can receive input from the user via the input component 102, which can include pulling or pushing an anomaly. For example, FIG. 3A indicates the pushing and pulling of an anomaly in conjunction with utilizing agglomerative clustering (e.g., AGNES). Further, FIG. 3A includes one or more clusters 300-314 of varying levels and a first anomaly 320 and a second anomaly 322. For example and without limitation, the notification component 106 can notify the user of an anomaly 320 and the input component 102 can receive a forcible action in response to the identified anomaly 320 to pull the anomaly 320 into a cluster 306. Additionally or alternatively, the notification component 106 can notify the user of an anomaly 322 and the input component 102 can receive a forcible action in response to the identified anomaly 322 to push the anomaly out of the respective cluster 314.

With embodiments, FIG. 3B illustrates the pushing and pulling of an anomaly in conjunction with divisive hierarchical clustering (e.g., DIANA). Further, FIG. 3B includes one or more clusters 340-354 of varying levels and a first anomaly 360 and a second anomaly 362. For example and without limitation, the notification component 106 can notify the user of an anomaly 360 and the input component 102 can receive a forcible action in response to the identified anomaly 360 to pull the anomaly 360 into a cluster 352. Additionally or alternatively, the notification component 106 can notify the user of an anomaly 362 and the input component 102 can receive a forcible action in response to the identified anomaly 362 to push the anomaly out of the respective cluster 360.

In examples, the evaluation component 104 can monitor the effect of the forcible actions on the accuracy of the monitoring system 100. In other words, the evaluation component 104 can track and notify the user if the system 100 is at risk of not detecting true-positives (e.g., anomalies) within the clusters after iteratively processing.

For example and without limitation, the evaluation component 104 can further generate group metadata for each of the detected anomalies and can merge/create one or more virtual pointers for the identified anomalies (e.g., metadata can contain parameters indicating the cohesion of the group as well as the group/stack level and which anomalies were pulled and pushed with correlating group IDs). The evaluation component 104 can use the metadata of previously identified anomalies in conjunction with other data to predict or suggest to the user a forcible action with respect to a similar anomaly. In embodiments, the monitoring system 100 can apply predicted forcible actions with or without input from the user for the anomalies. As the evaluation component 104 learns how the user responds to anomalies, the evaluation component 104 can track whether the system 100 accurately senses/detects anomalies (e.g., via a threshold tolerance set by the user). The evaluation component 104 can determine whether a stack mismatch is found for the anomaly. If a mismatch is found, the anomaly can be declared as an orphan and the user can be notified. Conversely, if a stack mismatch is not found, the evaluation component can determine if the cluster match for the identified anomaly is within the confidence threshold. If the cluster match is not within the desired threshold, the notification component 106 can indicate to the user that the system 100 that true-positives are not detected in one or more clusters.

With embodiments, a computer-implemented method 400 of monitoring the effect of forcible actions over a normalized feature set can comprise a first step of receiving input data (step 402). The input data can be a dataset of information to be processed/analyzed by the monitoring system. For example and without limitation, the dataset can include one or more of a variety of dataset types (e.g., customer data, accounting data, etc.). The method 400 can include extracting features from the input data (step 404) so that one or more clustering algorithms can be applied for data analysis. Further, the system 100 can process raw data from the input component into numerical features that can be processed while preserving the information within the original dataset. Once extracting the features from the dataset, one or more clustering algorithms can be applied to analyze the dataset (step 406).

In examples, the computer-implemented method 400 can iteratively apply the one or more clustering algorithms to identify anomalies of the normalized dataset (step 408). For example and without limitation, the clustering algorithm can identify an anomaly and can check whether the metric value of an element is greater than a pre-determined threshold (e.g., the threshold can be based on a particular use-case for the associated dataset as desired by the user). Additionally, monitoring anomalies of the dataset and the method 400 thereof can be further illustrated in FIGS. 5A and 5B. Once an anomaly has been identified, the method 400 can include receiving one or more forcible actions from the user as input for the associated anomaly such as to include or not include the anomaly in one or more of a variety of clusters (step 410). For example and without limitation, the forcible actions can include the push or pull of an anomaly from one or more levels (e.g., pertaining to hierarchy) of clusters in a group.

With embodiments, the computer-implemented method 400 can implement the user feedback prior to applying the clustering algorithm iteratively on the dataset to detect anomalies. Further, the method 400 can include iteratively repeating the steps of applying the clustering algorithm to the dataset (step 406) and checking whether the metric value of the anomaly has exceeded a pre-determined threshold of tolerance. In embodiments where the metric value of a detected anomaly exceeds the pre-determined threshold, the method 400 can include alerting the user that a saturation point has been reached for the dataset where true positives can no longer be identified by the method 400 (step 412). In other words, the method 400 can alert the user that anomalies can no longer be accurately detected by the non-limiting monitoring system 100 and/or method 400.

Figure 4:
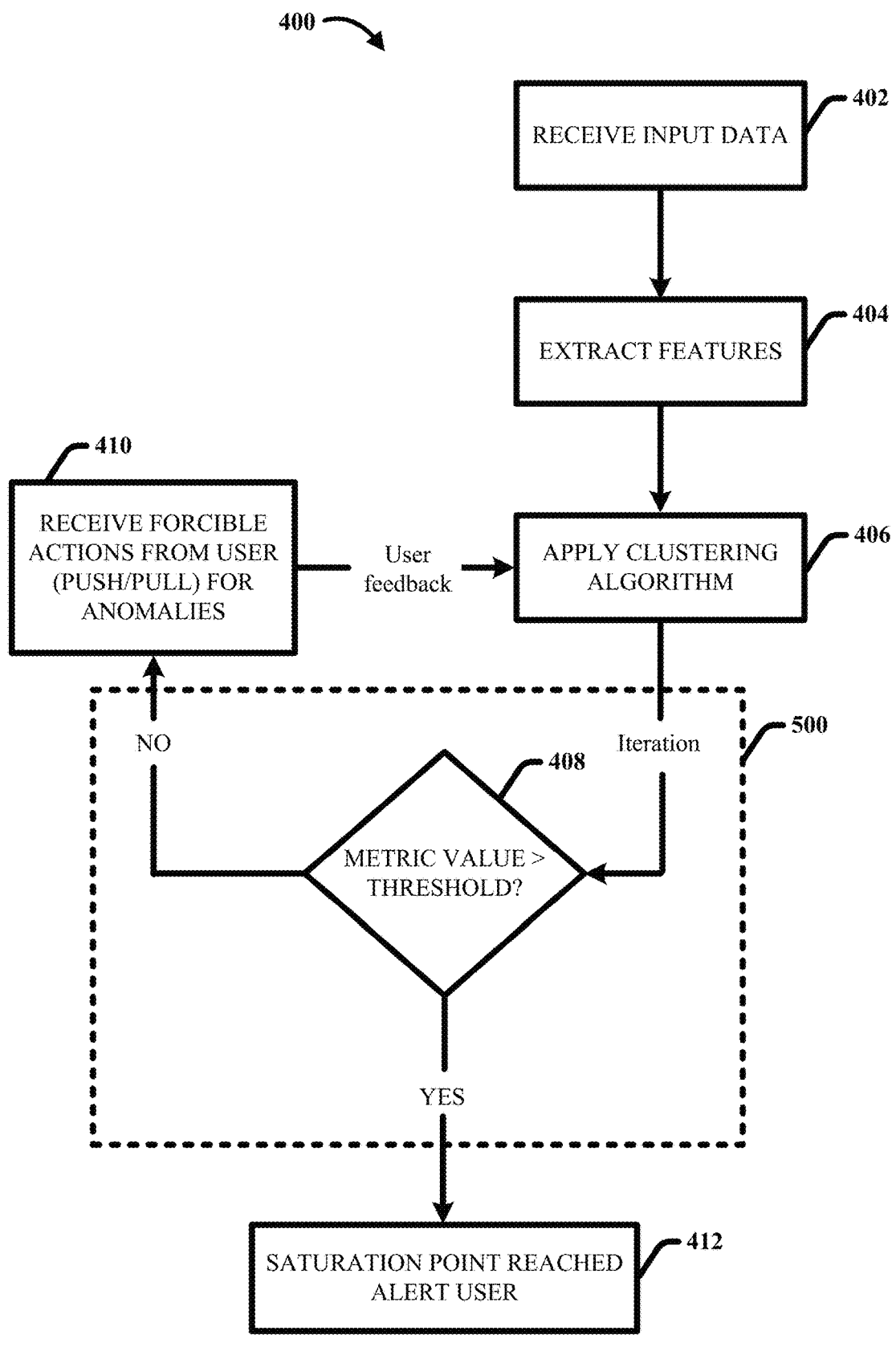
FIG. 4 illustrates a flow diagram of an example, non-limiting computer implemented method that can facilitate monitoring the effect of forcible actions over a normalized feature set, in accordance with one or more embodiments described herein.
Figure 5A:
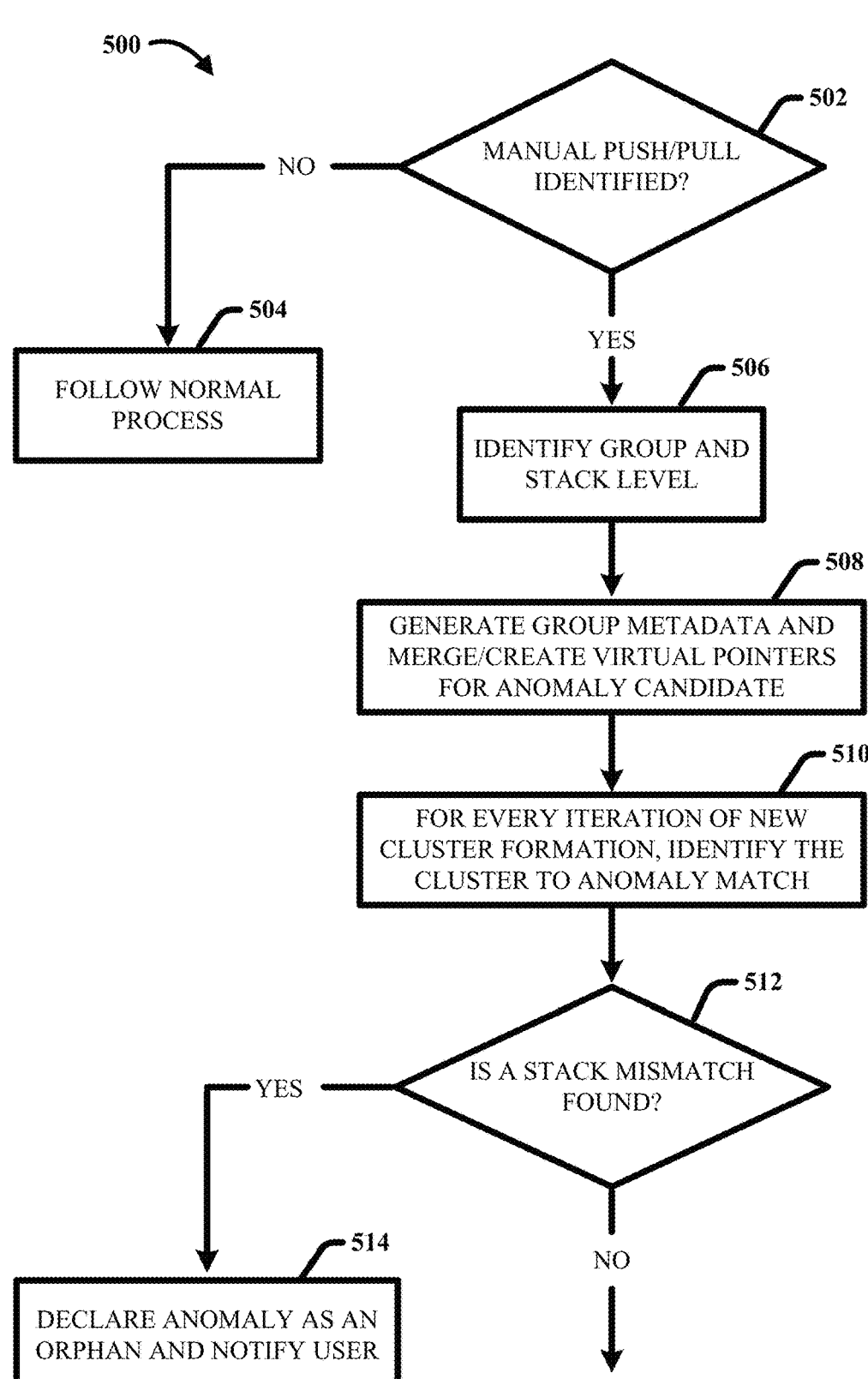
FIG. 5A illustrates a portion of a flow diagram of an example, non-limiting computer implemented method that can facilitate monitoring the effect of forcible actions over a normalized feature set in further detail, in accordance with one or more embodiments described herein.
Figure 5B:
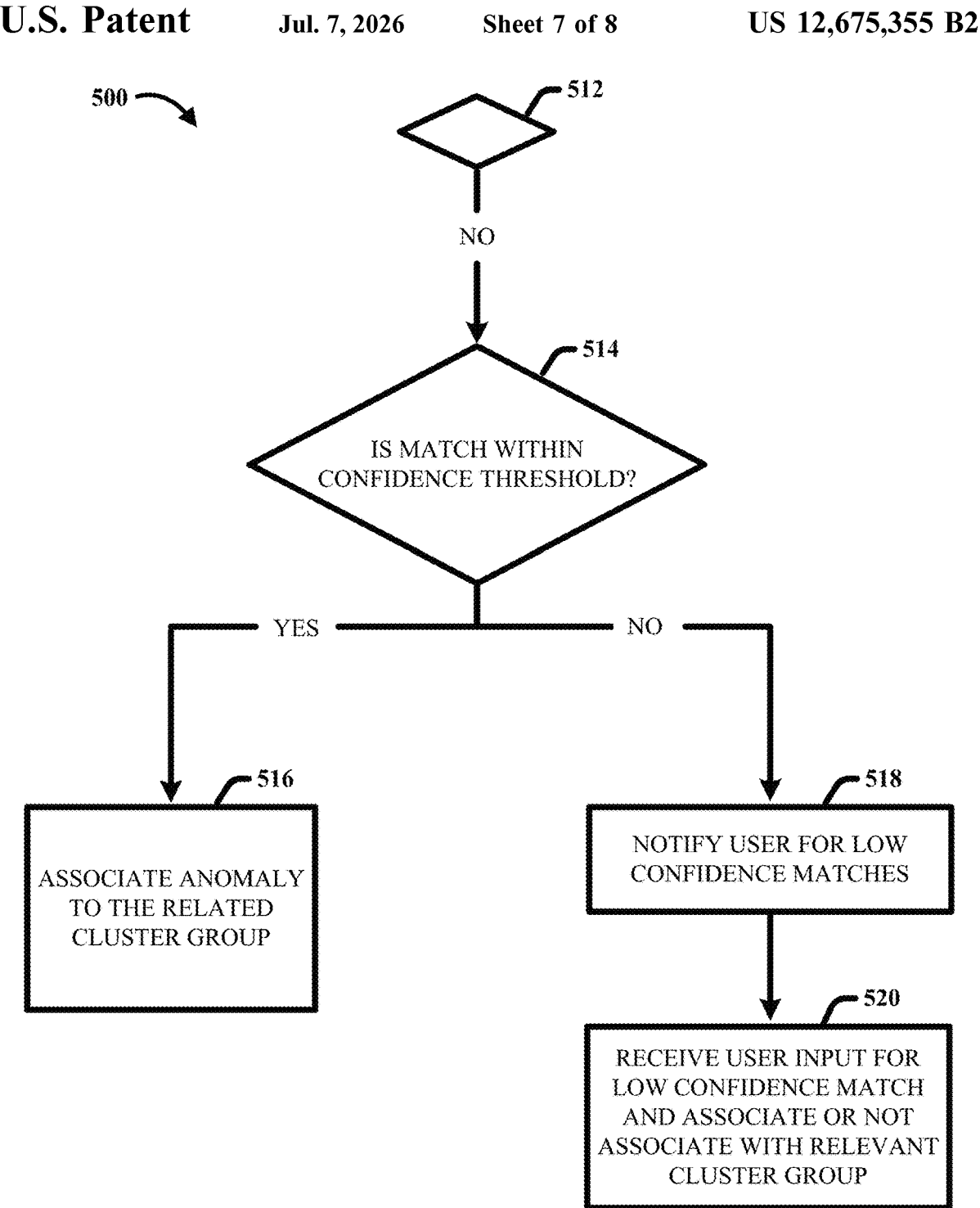
FIG. 5B illustrates a portion of a flow diagram of an example, non-limiting computer implemented method that can facilitate monitoring the effect of forcible actions over a normalized feature set in further detail, in accordance with one or more embodiments described herein.

In embodiments such as generally illustrated by FIGS. 5A and 5B, for each iteration of the method 400, the method 400 can include determining whether a forcible action has been identified (step 502) (e.g., the method of FIGS. 5A and 5B can be included within box 500 of FIG. 4). If the user did not manually push or pull the identified anomaly, then the normal clustering process can be followed for analyzing the remainder of the dataset (504). In this case, the method 400 can still accurately detect anomalies in the clusters. If a manual push/pull has been identified by the method 400, then the method 400 can include identifying the group and stack level of the identified anomaly (step 506). Further, the method 400 can track and monitor the group ID (e.g., can track the group that the push or pull occurred from).

With examples, such as illustrated in FIGS. 5A, the method 400 can include generating group metadata for each of the detected anomalies and merging/creating one or more virtual pointers for the identified anomaly (step 508). For example and without limitation, group metadata of the identified anomaly can include other parameters in terms of the cohesion of the group. Further, the virtual pointers can indicate where the push or pull derived from. In addition, the generated group metadata can be used for future matches (e.g., to suggest or predict actions for similarly detected anomalies). For iterations of new cluster formations, the method 400 can include identifying the cluster to anomaly match. For example, the method 400 can learn what actions the user has taken with respect to one or more of a variety of detected anomalies. Further, for new cluster formations, where a new anomaly is identified, the method 400 can compare the new anomaly with similar previously identified anomalies and determine whether the identified anomaly can fit into an existing cluster. The method 400 can include determining whether a stack mismatch is found for the identified anomaly (step 512). If a stack mismatch is found, the method 400 can include declaring the identified anomaly as an orphan and notifying the user of such (step 514).

In embodiments, such as generally illustrated in FIG. 5B, if a stack mismatch cannot be found, the method 400 can include determining whether the anomaly match is within a confidence threshold (e.g., can be determined by a user for a particular use-case) (step 514). For example and without limitation, in determining whether the match is within the confidence threshold, the method 400 can include considering the anomaly metadata, stratum, and Euclidean distance. The method 400 can include associating the anomaly to a related cluster group (step 516). In such a case, the method 400 can identify a similar anomaly that was previously identified. The method 400 can consider the previous user actions (e.g., the forcible actions) in response to the anomaly, and can propose and/or execute the previously applied forcible action on the newly identified anomaly. Based on such, the method 400 can inform the user which cluster the anomaly is most likely to be pushed/pulled to, and can ask for confirmation to proceed.

With embodiments, the method 400 can include notifying the user for low confidence matches of the identified anomaly (step 518). Low confidence matches indicate to the user that the system 100 may not be able to accurately identify true positives in the dataset. For example, the method 400 can monitor the effect of the user implemented forcible actions on the respective anomaly as well as the overall functionality of the system (e.g., by iteratively confirming that matches are within the confidence threshold). The identified anomalies having low confidence threshold matches can be displayed to the user for further action (e.g., to determine whether to associate the identified anomaly with a suggested cluster based on previously monitored user actions on the system 100, to a different cluster, or not to any cluster) (step 520). The user can elect to switch to a different clustering algorithm and can reset the learning of the existing clustering algorithm. Semi-supervised learning can be implemented with the method 400 so that Composite F Scores can be used in analysis. Similarly, for supervised learning, recall, precision, and accuracy data can be evaluated and monitored over time via the method 400. In this manner, the method 400 can train the system 100 via user input (e.g., forcible actions monitored overtime on the system 100) whereby the user feedback can be distinct from the original system (e.g., not merged with the original system).

For example, one or more embodiments described herein of the monitoring system 100 and/or one or more components thereof can employ one or more computing resources of the computing environment 600 described below with reference to the illustration 600 of FIG. 6. For instance, the system and/or components thereof can employ one or more classical and/or quantum computing resources to execute one or more classical and/or quantum: mathematical functions, calculations and/or equations; computing and/or processing scripts; algorithms; models (e.g., artificial intelligence (AI) models, machine learning (ML) models and/or like model); and/or another operation in accordance with one or more embodiments described herein.

It is to be understood that although one or more embodiments described herein include a detailed description on cloud computing, implementation of the teachings recited herein are not limited to a cloud computing environment. Rather, one or more embodiments described herein are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth and active user accounts). Resource usage can be monitored, controlled and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage or individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems or storage, but has control over the deployed applications and possibly application hosting environment configurations.

Infrastructure as a Service (IaaS): the capability provided to the consumer is to provision processing, storage, networks and/or other fundamental computing resources where the consumer can deploy and run arbitrary software, which can include operating systems and applications. The consumer does not manage or control the underlying cloud infrastructure but has control over operating systems, storage, deployed applications and/or possibly limited control of select networking components (e.g., host firewalls).

A cloud computing environment is service oriented with a focus on statelessness, low coupling, modularity and/or semantic interoperability. At the heart of cloud computing is an infrastructure that includes a network of interconnected nodes.

Moreover, the monitoring system 100 can be associated with or be included in a data analytics system, a data processing system, a graph analytics system, a graph processing system, a big data system, a social network system, a speech recognition system, an image recognition system, a graphical modeling system, a bioinformatics system, a data compression system, an artificial intelligence system, an authentication system, a syntactic pattern recognition system, a medical system, a health monitoring system, a network system, a computer network system, a communication system, a router system, a server system, a high availability server system (e.g., a Telecom server system), a Web server system, a file server system, a data server system, a disk array system, a powered insertion board system, a cloud-based system or the like. In accordance therewith, the monitoring system 100 can be employed to use hardware and/or software to solve problems that are highly technical in nature, that are not abstract and/or that cannot be performed as a set of mental acts by a human.

It should be appreciated that the embodiments depicted in various figures disclosed herein are for illustration only, and as such, the architecture of embodiments is not limited to the systems, devices and/or components depicted therein, nor to any particular order, connection and/or coupling of systems, devices and/or components depicted therein. For example, in some embodiments, the monitoring system 100 can further comprise various computer and/or computing-based elements described herein with reference to computing environment 600 and FIG. 6. In several embodiments, computer and/or computing-based elements can be used in connection with implementing one or more of the systems, devices, components and/or computer-implemented operations shown and described in connection with FIG. 1 or with other figures disclosed herein.

Memory 124 can store one or more computer and/or machine readable, writable and/or executable components and/or instructions that, when executed by processor 122 (e.g., a classical processor, a quantum processor and/or like processor), can facilitate performance of operations defined by the executable component(s) and/or instruction(s). For example, memory 124 can store computer and/or machine readable, writable and/or executable components and/or instructions that, when executed by processor 122, can facilitate execution of the various functions described herein relating to the input component 102, the evaluation component 104, the notification component 106, and/or another component associated with the monitoring system 100 as described herein with or without reference to the various figures of the one or more embodiments.

Memory 124 can comprise volatile memory (e.g., random access memory (RAM), static RAM (SRAM), dynamic RAM (DRAM) and/or the like) and/or non-volatile memory (e.g., read only memory (ROM), programmable ROM (PROM), electrically programmable ROM (EPROM), electrically erasable programmable ROM (EEPROM) and/or the like) that can employ one or more memory architectures. Further examples of memory 124 are described below with reference to system volatile memory 612 and FIG. 6. These examples of memory 124 can be employed to implement any one or more embodiments described herein.

Processor 122 can comprise one or more types of processors and/or electronic circuitry (e.g., a classical processor, a quantum processor and/or like processor) that can implement one or more computer and/or machine readable, writable and/or executable components and/or instructions that can be stored at memory 124. For example, processor 122 can perform various operations that can be specified by computer and/or machine readable, writable and/or executable components and/or instructions including, but not limited to, logic, control, input/output (I/O), arithmetic and/or the like. In some embodiments, processor 122 can comprise one or more central processing units, multi-core processors, microprocessors, dual microprocessors, microcontrollers, System on a Chip (SOCs), array processors, vector processors, quantum processors and/or another type of processor.

Additional examples of processor 122 are described below with reference to processor set 610 and FIG. 6. The examples of processor 122 can be employed to implement any one or more embodiments described herein.

The monitoring system 100, the input component 102, the evaluation component 104, the notification component 106, the processor 122, the memory 124, and/or another component of system 100 as described herein can be communicatively, electrically, operatively and/or optically coupled to one another via system bus 120 to perform functions of system 100 and/or any components coupled therewith. System bus 120 can comprise one or more memory buses, memory controllers, peripheral buses, external buses, local buses, a quantum buses and/or another type of bus that can employ various bus architectures. The examples of system bus 120 can be employed to implement any one or more embodiments described herein.

The monitoring system 100 can comprise any type of component, machine, device, facility, apparatus and/or instrument that comprises a processor and/or can be capable of effective and/or operative communication with a wired and/or wireless network. All suitable such embodiments are envisioned. For example, the monitoring system 100 can comprise a server device, a computing device, a general-purpose computer, a special-purpose computer, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players and/or another type of device.

The monitoring system 100 can be coupled (e.g., communicatively, electrically, operatively, optically and/or the like) to one or more external systems, sources and/or devices (e.g., classical and/or quantum computing devices, communication devices and/or the like) via a data cable (e.g., High-Definition Multimedia Interface (HDMI), recommended standard (RS) 232, Ethernet cable and/or the like). In some embodiments, the monitoring system 100 can be coupled (e.g., communicatively, electrically, operatively, optically and/or the like) to one or more external systems, sources and/or devices (e.g., classical and/or quantum computing devices, communication devices and/or the like) via a network.

In some embodiments, a network 130 can comprise one or more wired and/or wireless networks, including, but not limited to, a cellular network, a wide area network (WAN) (e.g., the Internet), or a local area network (LAN). For example, the monitoring system 100, the input component 102, the evaluation component 104, and/or the notification component 106 can communicate with one or more external systems, sources and/or devices, for instance, computing devices (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol and/or other proprietary and/or non-proprietary communication protocols. In a related example, the monitoring system 100 can include hardware (e.g., a central processing unit (CPU), a transceiver, a decoder, quantum hardware, a quantum processor and/or the like), software (e.g., a set of threads, a set of processes, software in execution, quantum pulse schedule, quantum circuit, quantum gates and/or the like) and/or a combination of hardware and software that facilitates communicating information among the monitoring system 100 and external systems, sources and/or devices (e.g., computing devices, communication devices and/or the like).

The monitoring system 100 can comprise one or more computer and/or machine readable, writable and/or executable components and/or instructions that, when executed by processor 122 (e.g., a classical processor, a quantum processor and/or the like), can facilitate performance of one or more operations defined by such component(s) and/or instruction(s). Further, in numerous embodiments, any component associated with the monitoring system 100, as described herein with or without reference to the various figures of the one or more embodiments, can comprise one or more computer and/or machine readable, writable and/or executable components and/or instructions that, when executed by processor 122, can facilitate performance of one or more operations defined by such component(s) and/or instruction(s). For example, the input component 102, the evaluation component 104, and/or the notification component 106 and/or any other components associated with the monitoring system 100 as disclosed herein (e.g., communicatively, electronically, operatively and/or optically coupled with and/or employed by system 100), can comprise such computer and/or machine readable, writable and/or executable component(s) and/or instruction(s). Consequently, according to numerous embodiments, the monitoring system 100 and/or any components associated therewith as disclosed herein, can employ processor 122 to execute such computer and/or machine readable, writable and/or executable component(s) and/or instruction(s) to facilitate performance of one or more operations described herein with reference to system 100 and/or any such components associated therewith.

The monitoring system 100 can facilitate (e.g., via processor 122) performance of operations executed by and/or associated with input component 102, the evaluation component 104, the notification component 106, and/or another component associated with system 100 as disclosed herein. For instance, as described in detail below, the monitoring system 100 can facilitate via processor 122 (e.g., a classical processor, a quantum processor and/or the like): generating one or more language invariant signals; generating a complete query intent using the one or more language invariant signals; and/or processing the complete query intent to an executable backend query to facilitate multi-lingual query interpretation. As will be apparent from the below, one or more systems can be employed to facilitate zero-shot transfer of the one or more language invariant signals (e.g., such as to be independent of domain/language specific training).

In embodiments, the monitoring system 100 can include one or more input components 102, one or more evaluation components 104, one or more notification components 106, one or more system buses 120, one or more processors 122, one or more memory/storage components 124, one or more networks 130, one or more input devices 132, and/or one or more computer applications 134. The input component 102, the evaluation component 104, and the notification component 106 can be connected with one or more machines comprised by the monitoring system 100. As used herein, the one or more machines can include one or more of a computing device, a general-purpose computer, a special-purpose computer, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone and/or another type of device.

Turning next to FIG. 6, the following discussion and associated figure are intended to provide a brief, general description of a suitable computing environment 600 in which one or more embodiments described herein at FIGS. 1-5B can be implemented. For example, various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 600 contains an example of an environment for the execution of at least some of the computer code involved in performing the inventive methods, such as forcible effect monitoring code block 700. In addition to block 700, computing environment 600 includes, for example, computer 601, wide area network (WAN) 602, end user device (EUD) 603, remote server 604, public cloud 605, and private cloud 606. In this embodiment, computer 601 includes processor set 610 (including processing circuitry 620 and cache 621), communication fabric 611, volatile memory 612, persistent storage 613 (including operating system 622 and block 700, as identified above), peripheral device set 614 (including user interface (UI), device set 623, storage 624, and Internet of Things (IoT) sensor set 625), and network module 615. Remote server 604 includes remote database 630. Public cloud 605 includes gateway 640, cloud orchestration module 641, host physical machine set 642, virtual machine set 643, and container set 644.

COMPUTER 601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 630. As is well understood in the art of computer technology, and depending upon the technology, performance of a computer-implemented method may be distributed among multiple computers and/or between multiple locations. On the other hand, in this presentation of computing environment 600, detailed discussion is focused on a single computer, specifically computer 601, to keep the presentation as simple as possible. Computer 601 may be located in a cloud, even though it is not shown in a cloud in FIG. 6. On the other hand, computer 601 is not required to be in a cloud except to any extent as may be affirmatively indicated.

PROCESSOR SET 610 includes one, or more, computer processors of any type now known or to be developed in the future. Processing circuitry 620 may be distributed over multiple packages, for example, multiple, coordinated integrated circuit chips. Processing circuitry 620 may implement multiple processor threads and/or multiple processor cores. Cache 621 is memory that is located in the processor chip package(s) and is typically used for data or code that should be available for rapid access by the threads or cores running on processor set 610. Cache memories are typically organized into multiple levels depending upon relative proximity to the processing circuitry. Alternatively, some, or all, of the cache for the processor set may be located "off chip." In some computing environments, processor set 610 may be designed for working with qubits and performing quantum computing.

Computer readable program instructions are typically loaded onto computer 601 to cause a series of operational steps to be performed by processor set 610 of computer 601 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 621 and the other storage media discussed below. The program instructions, and associated data, are accessed by processor set 610 to control and direct performance of the inventive methods. In computing environment 600, at least some of the instructions for performing the inventive methods may be stored in block 700 in persistent storage 613.

COMMUNICATION FABRIC 611 is the signal conduction paths that allow the various components of computer 601 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 612 is any type of volatile memory now known or to be developed in the future. Examples include dynamic type random access memory (RAM) or static type RAM. Typically, the volatile memory is characterized by random access, but this is not required unless affirmatively indicated. In computer 601, the volatile memory 612 is located in a single package and is internal to computer 601, but, alternatively or additionally, the volatile memory may be distributed over multiple packages and/or located externally with respect to computer 601.

PERSISTENT STORAGE 613 is any form of non-volatile storage for computers that is now known or to be developed in the future. The non-volatility of this storage means that the stored data is maintained regardless of whether power is being supplied to computer 601 and/or directly to persistent storage 613. Persistent storage 613 may be a read only memory (ROM), but typically at least a portion of the persistent storage allows writing of data, deletion of data and re-writing of data. Some familiar forms of persistent storage include magnetic disks and solid state storage devices. Operating system 622 may take several forms, such as various known proprietary operating systems or open source Portable Operating System Interface type operating systems that employ a kernel. The code included in block 700 typically includes at least some of the computer code involved in performing the inventive methods.

PERIPHERAL DEVICE SET 614 includes the set of peripheral devices of computer 601. Data communication connections between the peripheral devices and the other components of computer 601 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 623 may include components such as a display screen, speaker, microphone, wearable devices (such as goggles and smart watches), keyboard, mouse, printer, touchpad, game controllers, and haptic devices. Storage 624 is external storage, such as an external hard drive, or insertable storage, such as an SD card. Storage 624 may be persistent and/or volatile. In some embodiments, storage 624 may take the form of a quantum computing storage device for storing data in the form of qubits. In embodiments where computer 601 is required to have a large amount of storage (for example, where computer 601 locally stores and manages a large database) then this storage may be provided by peripheral storage devices designed for storing very large amounts of data, such as a storage area network (SAN) that is shared by multiple, geographically distributed computers. IoT sensor set 625 is made up of sensors that can be used in Internet of Things applications. For example, one sensor may be a thermometer and another sensor may be a motion detector.

NETWORK MODULE 615 is the collection of computer software, hardware, and firmware that allows computer 601 to communicate with other computers through WAN 602. Network module 615 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 615 are performed on the same physical hardware device. In other embodiments (for example, embodiments that utilize software-defined networking (SDN)), the control functions and the forwarding functions of network module 615 are performed on physically separate devices, such that the control functions manage several different network hardware devices. Computer readable program instructions for performing the inventive methods can typically be downloaded to computer 601 from an external computer or external storage device through a network adapter card or network interface included in network module 615.

WAN 602 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 603 is any computer system that is used and controlled by an end user (for example, a customer of an enterprise that operates computer 601), and may take any of the forms discussed above in connection with computer 601. EUD 603 typically receives helpful and useful data from the operations of computer 601. For example, in a hypothetical case where computer 601 is designed to provide a recommendation to an end user, this recommendation would typically be communicated from network module 615 of computer 601 through WAN 602 to EUD 603. In this way, EUD 603 can display, or otherwise present, the recommendation to an end user. In some embodiments, EUD 603 may be a client device, such as thin client, heavy client, mainframe computer, desktop computer and so on.

REMOTE SERVER 604 is any computer system that serves at least some data and/or functionality to computer 601. Remote server 604 may be controlled and used by the same entity that operates computer 601. Remote server 604 represents the machine(s) that collect and store helpful and useful data for use by other computers, such as computer 601. For example, in a hypothetical case where computer 601 is designed and programmed to provide a recommendation based on historical data, then this historical data may be provided to computer 601 from remote database 630 of remote server 604.

PUBLIC CLOUD 605 is any computer system available for use by multiple entities that provides on-demand availability of computer system resources and/or other computer capabilities, especially data storage (cloud storage) and computing power, without direct active management by the scale. The direct and active management of the computing resources of public cloud 605 is performed by the computer hardware and/or software of cloud orchestration module 641. The computing resources provided by public cloud 605 are typically implemented by virtual computing environments that run on various computers making up the computers of host physical machine set 642, which is the universe of physical computers in and/or available to public cloud 605. The virtual computing environments (VCEs) typically take the form of virtual machines from virtual machine set 643 and/or containers from container set 644. It is understood that these VCEs may be stored as images and may be transferred among and between the various physical machine hosts, either as images or after instantiation of the VCE. Cloud orchestration module 641 manages the transfer and storage of images, deploys new instantiations of VCEs and manages active instantiations of VCE deployments. Gateway 640 is the collection of computer software, hardware, and firmware that allows public cloud 605 to communicate through WAN 602.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 606 is similar to public cloud 605, except that the computing resources are only available for use by a single enterprise. While private cloud 606 is depicted as being in communication with WAN 602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 605 and private cloud 606 are both part of a larger hybrid cloud.

The embodiments described herein can be directed to one or more of a system, a method, an apparatus or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network or a wireless network. The network can comprise copper transmission cables, optical transmission fibers, wireless transmission, routers, firewalls, switches, gateway computers or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, or source code or object code written in any combination of one or more programming languages, including an object oriented programming language such as Smalltalk, C++ or the like, or procedural programming languages, such as the "C" programming language or similar programming languages. The computer readable program instructions can execute entirely on the user's computer, partly on the user's computer, as a stand-alone software package, partly on the user's computer or partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In one or more embodiments, electronic circuitry including, for example, programmable logic circuitry, field-programmable gate arrays (FPGA) or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described herein with reference to flowchart illustrations or block diagrams of methods, apparatus (systems), and computer program products according to one or more embodiments described herein. It will be understood that each block of the flowchart illustrations or block diagrams, and combinations of blocks in the flowchart illustrations or block diagrams, can be implemented by computer readable program instructions. These computer readable program instructions can be provided to a processor of a general purpose computer, special purpose computer or other programmable data processing apparatus to produce a machine, such that the instructions, which execute via the processor of the computer or other programmable data processing apparatus, create means for implementing the functions/acts specified in the flowchart or block diagram block or blocks. These computer readable program instructions can also be stored in a computer readable storage medium that can direct a computer, a programmable data processing apparatus or other devices to function in a particular manner, such that the computer readable storage medium having instructions stored therein comprises an article of manufacture including instructions which implement aspects of the function/act specified in the flowchart or block diagram block or blocks. The computer readable program instructions can also be loaded onto a computer, other programmable data processing apparatus or other device to cause a series of operational acts to be performed on the computer, other programmable apparatus or other device to produce a computer implemented process, such that the instructions which execute on the computer, other programmable apparatus or other device implement the functions/acts specified in the flowchart or block diagram block or blocks.

The flowcharts and block diagrams in the figures illustrate the architecture, functionality, and operation of possible implementations of systems, computer-implementable methods or computer program products according to one or more embodiments described herein. In this regard, each block in the flowchart or block diagrams can represent a module, segment or portion of instructions, which comprises one or more executable instructions for implementing the specified logical function(s). In one or more alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer or computers, those skilled in the art will recognize that the one or more embodiments herein also can be implemented in combination with other program modules. Generally, program modules include routines, programs, components, data structures or the like that perform particular tasks or implement particular abstract data types. Moreover, those skilled in the art will appreciate that the inventive computer-implemented methods can be practiced with other computer system configurations, including single-processor or multi-processor computer systems, mini-computing devices, mainframe computers, as well as computers, hand-held computing devices (e.g., PDA, phone), microprocessor-based or programmable consumer or industrial electronics or the like. The illustrated aspects can also be practiced in distributed computing environments in which tasks are performed by remote processing devices that are linked through a communications network. However, some, if not all aspects of the one or more embodiments can be practiced on stand-alone computers. In a distributed computing environment, program modules can be located in both local and remote memory storage devices.

As used in this application, the terms "component," "system," "platform," "interface," or the like, can refer to or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program or a computer. By way of illustration, both an application running on a server and the server can be a component. One or more components can reside within a process or thread of execution and a component can be localized on one computer or distributed between two or more computers. In another example, respective components can execute from various computer readable media having various data structures stored thereon. The components can communicate via local or remote processes such as in accordance with a signal having one or more data packets (e.g., data from one component interacting with another component in a local system, distributed system or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, where the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) or Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing the one or more embodiments, but one of ordinary skill in the art can recognize that many further combinations and permutations of the one or more embodiments are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the one or more embodiments provided herein have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
a memory that stores computer executable components; and
a processor that executes at least one of the computer executable components that:
monitors an anomaly detection clustering engine, wherein the monitoring comprises:
receiving, via a user interface device, one or more forcible actions as input from a user that correspond to an identified anomaly instance of a cluster, wherein the one or more forcible actions comprise a user selection to push or pull the identified anomaly instance between clusters or between hierarchical levels of the clusters in the anomaly detection clustering engine;
storing historical metadata describing the one or more forcible actions;
evaluating, over a plurality of anomaly detection iterations, an effect of the one or more forcible actions executed over time on a performance metric of the anomaly detection clustering engine, wherein the evaluating comprises determining, from historical metadata, that a saturation point has occurred in which additional forcible actions would cause the anomaly detection clustering engine to fail to detect true-positives within the cluster; and
notifying the user that the saturation point and a true-positive detection threshold have been reached for the cluster such that true-positives are not detected in the cluster by the anomaly detection clustering engine.

2. The system of claim 1, wherein the one or more forcible actions include pulling the identified anomaly instance within a specified group of the clusters.

3. The system of claim 2, wherein the identified anomaly instance is pulled from one or more hierarchical levels of clusters in the specified group.

4. The system of claim 1, wherein the identified anomaly instance is pushed from a current distance from a specified group of the clusters to a farther distance from the specified group.

5. The system of claim 4, wherein the one or more forcible actions include pushing the identified anomaly instance from the specified group of the clusters pertaining to one or more hierarchical levels of the clusters in the specified group.

6. The system of claim 1, wherein the at least one of the computer executable components identifies a group and a stack level of the identified anomaly instance and generates group metadata corresponding to the identified anomaly instance.

7. The system of claim 1, wherein the at least one of the computer executable components identifies a cluster to anomaly match of the identified anomaly instance to determine whether a confidence threshold of the anomaly detection clustering engine has been breached.

8. A computer implemented method of monitoring an effect of forcible actions over a normalized feature set, comprising:
monitoring, using a processor, an anomaly detection clustering engine, wherein the monitoring comprises:
receiving, via a user interface device, one or more forcible actions as input from a user that correspond to an identified anomaly instance of a cluster, wherein the one or more forcible actions comprise a user selection to push or pull the identified anomaly instance between clusters or between hierarchical levels of the clusters in the anomaly detection clustering engine;

storing historical metadata describing the one or more forcible actions;

evaluating, over a plurality of anomaly detection iterations, an effect of the one or more forcible actions executed over time on a performance metric of the anomaly detection clustering engine, wherein the evaluating comprises determining, from historical metadata, that a saturation point has occurred in which additional forcible actions would cause the anomaly detection clustering engine to fail to detect true-positives within the cluster; and notifying the user that the saturation point and a true-positive detection threshold have been reached for the cluster such that true-positives are not detected in the cluster by the anomaly detection clustering engine.

9. The computer implemented method of claim 8, wherein the one or more forcible actions include pulling the identified anomaly instance within a specified group of the clusters.

10. The computer implemented method of claim 9, wherein the identified anomaly instance is pulled from one or more hierarchical levels of clusters in the specified group.

11. The computer implemented method of claim 8, wherein the identified anomaly instance is pushed from a current distance from a specified group of the clusters to a farther distance from the specified group.

12. The computer implemented method of claim 11, wherein the one or more forcible actions include pushing the identified anomaly instance from the specified group of the clusters pertaining to one or more hierarchical levels of the clusters in the specified group.

13. The computer implemented method of claim 8, further comprising:

identifying, using the processor, a group and a stack level of the identified anomaly instance; and generating, using the processor, group metadata corresponding to the identified anomaly instance.

14. The computer implemented method of claim 8, further comprising:

identifying, via the processor, a cluster to anomaly match of the identified anomaly instance to determine whether a confidence threshold of the anomaly detection clustering engine has been breached.

15. A computer program product for monitoring an effect of forcible actions over a normalized feature set, the computer program product comprising a computer readable storage medium having program instructions embodied therewith, the program instructions executable by a processor to cause the processor to:

monitor an anomaly detection clustering engine, wherein the monitoring comprises:

receiving, via a user interface device, one or more forcible actions as input from a user that correspond to an identified anomaly instance of a cluster, wherein the one or more forcible actions comprise a user selection to push or pull the identified anomaly instance between clusters or between hierarchical levels of the clusters in the anomaly detection clustering engine;

storing historical metadata describing the one or more forcible actions;

evaluating, over a plurality of anomaly detection iterations, an effect of the one or more forcible actions executed over time on a performance metric of the anomaly detection clustering engine, wherein the evaluating comprises determining, from historical metadata, that a saturation point has occurred in which additional forcible actions would cause the anomaly detection clustering engine to fail to detect true-positives within the cluster; and notifying the user that the saturation point and a true-positive detection threshold have been reached for the cluster such that true-positives are not detected in the cluster by the anomaly detection clustering engine.

16. The computer program product of claim 15, wherein the one or more forcible actions include pulling the identified anomaly instance within a specified group of the clusters.

17. The computer program product of claim 16, wherein the identified anomaly instance is pulled from one or more hierarchical levels of clusters in the specified group.

18. The computer program product of claim 15, wherein the identified anomaly instance is pushed from a current distance from a specified group of the clusters to a farther distance from the specified group.

19. The computer program product of claim 15, wherein the program instructions further cause the processor to:

identify a group and a stack level of the identified anomaly instance; and generate group metadata corresponding to the identified anomaly instance.

20. The computer program product of claim 15, wherein the program instructions further cause the processor to:

identify a cluster to anomaly match of the identified anomaly instance to determine whether a confidence threshold of the anomaly detection clustering engine has been breached.

* * * * *